United States Patent

Chen

(10) Patent No.: US 9,505,059 B2
(45) Date of Patent: Nov. 29, 2016

(54) TOOLS HOLDER

(71) Applicant: X'POLE PRECISION TOOLS INC., Taoyuan County (TW)

(72) Inventor: Peter Chen, Taoyuan County (TW)

(73) Assignee: X'POLE PRECISION TOOLS INC., Taoyuan County (TW)

( * ) Notice: Subject to any disclaimer, the term of this patent is extended or adjusted under 35 U.S.C. 154(b) by 19 days.

(21) Appl. No.: 14/513,247

(22) Filed: Oct. 14, 2014

(65) Prior Publication Data

US 2016/0101472 A1    Apr. 14, 2016

(51) Int. Cl.
*B23B 5/00* (2006.01)
*B23B 29/04* (2006.01)
*B23B 31/107* (2006.01)
*B23B 31/00* (2006.01)

(52) U.S. Cl.
CPC ............ *B23B 29/046* (2013.01); *B23B 31/005* (2013.01); *B23B 31/1075* (2013.01); *B23B 2210/08* (2013.01); *B23B 2231/0252* (2013.01); *B23B 2231/0256* (2013.01); *B23B 2240/36* (2013.01)

(58) Field of Classification Search
CPC .............. B23B 2231/0252; B23B 2231/0256; B23B 31/005; B23B 31/1075; B23B 2210/08; Y10T 279/17821; Y10T 408/907; Y10T 408/95; Y10T 409/30952
USPC ........ 408/226, 239 R, 239 A, 233, 185, 197; 409/232, 234, 279; 279/83; 82/161
See application file for complete search history.

(56) References Cited

U.S. PATENT DOCUMENTS

| | | | | |
|---|---|---|---|---|
| 1,502,528 A | * | 7/1924 | Reulbach | B23Q 1/703 248/188.5 |
| 1,596,708 A | * | 8/1926 | Bellows | B25B 23/0035 279/83 |
| 1,647,802 A | * | 11/1927 | Josef | F16D 1/04 279/83 |
| 1,958,817 A | * | 5/1934 | Gase | B23B 31/1075 279/83 |
| 2,263,579 A | * | 11/1941 | Hokanson | E21B 17/04 175/320 |
| 2,361,683 A | * | 10/1944 | Greenberg | B23B 31/1075 279/144 |
| 2,362,053 A | * | 11/1944 | Danielson | B23B 31/1075 279/83 |
| 2,416,285 A | * | 2/1947 | Buckingham | H01R 33/72 279/83 |
| 2,533,179 A | * | 12/1950 | Redinger | B23B 31/1075 279/83 |
| 2,716,030 A | * | 8/1955 | Faso | B23Q 1/703 279/103 |

(Continued)

*Primary Examiner* — Sara Addisu
(74) *Attorney, Agent, or Firm* — Chun-Ming Shih

(57) ABSTRACT

A tools holder is provided with a base including a rear fastening member configured to secure to a mounting groove of a lathe, and a front groove member, and at least one hole extending from an outer surface to the groove member; a blade including a front cutting member and a rear tenon fitted into the groove member; and at least one fastener each driven through one of the at least one hole to urge against the tenon for fastening the base and the blade. The tools holder is capable of increasing length by assembling at least one interconnecting member between the base and the blade. Further, the assembly is secured due to complimentary engagement of any two adjacent components and the provision of threaded fasteners.

6 Claims, 3 Drawing Sheets

(56) References Cited

U.S. PATENT DOCUMENTS

| | | | | |
|---|---|---|---|---|
| 3,202,433 A * | 8/1965 | Davis | B23B 31/028 | 279/105.1 |
| 3,507,508 A * | 4/1970 | Andrews | B23B 31/1075 | 279/83 |
| 3,521,507 A * | 7/1970 | Yogus | B23B 29/03407 | 407/37 |
| 3,691,883 A * | 9/1972 | Ingram | B23B 23/00 | 279/143 |
| 3,822,960 A * | 7/1974 | Degen | B23B 31/11 | 408/226 |
| 3,841,646 A * | 10/1974 | Bennett | B23B 29/20 | 279/14 |
| 3,975,031 A * | 8/1976 | Bennett | B23B 29/20 | 279/14 |
| 3,994,615 A * | 11/1976 | Narang | B23B 31/005 | 279/83 |
| 4,063,843 A * | 12/1977 | Barkley | B23B 31/028 | 408/146 |
| 4,133,545 A * | 1/1979 | Komori | B23B 31/00 | 279/126 |
| 4,332,160 A * | 6/1982 | Baragar | G01N 33/24 | 73/84 |
| 4,353,670 A * | 10/1982 | Jorgensen | B23B 31/1075 | 408/193 |
| 4,575,292 A * | 3/1986 | Pape | B23B 31/008 | 279/97 |
| 4,579,488 A * | 4/1986 | Griffin | B23B 27/007 | 408/59 |
| 4,595,320 A * | 6/1986 | Berner | B23B 29/03403 | 407/37 |
| 4,629,374 A * | 12/1986 | Berner | B23B 31/113 | 279/7 |
| 4,647,052 A * | 3/1987 | Butikofer | B23B 31/1076 | 279/83 |
| 4,766,783 A * | 8/1988 | Stanich | B25B 13/481 | 81/177.2 |
| 4,803,904 A * | 2/1989 | Stanich | B25B 13/481 | 81/177.2 |
| 4,958,966 A * | 9/1990 | Andrews | B23B 31/1075 | 279/143 |
| 5,040,932 A * | 8/1991 | Oshnock | B23B 29/046 | 279/75 |
| 5,163,790 A * | 11/1992 | Vig | B23B 31/1107 | 279/8 |
| 5,378,076 A * | 1/1995 | D'Andrea | B23B 31/1077 | 403/22 |
| 5,391,022 A * | 2/1995 | Nakayama | B23B 29/022 | 279/8 |
| 5,402,696 A * | 4/1995 | Hecht | B23Q 1/0036 | 279/20 |
| 5,403,134 A * | 4/1995 | Andersson | B23B 31/005 | 279/83 |
| 5,468,102 A * | 11/1995 | Stojanovski | B23B 31/008 | 279/83 |
| 5,555,784 A * | 9/1996 | Muendlein | B23B 27/00 | 407/101 |
| 5,601,295 A * | 2/1997 | Baker | B23B 31/02 | 279/133 |
| 5,683,212 A * | 11/1997 | Cirino | B23B 31/261 | 279/2.11 |
| 5,769,577 A * | 6/1998 | Boddy | B23B 29/046 | 408/197 |
| 5,873,682 A * | 2/1999 | Tripsa | B23B 29/046 | 407/101 |
| 5,924,826 A * | 7/1999 | Bystrom | B23B 27/1625 | 407/103 |
| 6,062,090 A * | 5/2000 | Bachhuber | E02D 1/022 | 73/784 |
| 6,276,880 B1 * | 8/2001 | Cirino | B23B 29/046 | 403/374.1 |
| 6,299,180 B1 * | 10/2001 | Satran | B23B 31/1075 | 279/83 |
| 6,299,394 B1 * | 10/2001 | Stojanovski | B23B 31/1076 | 279/83 |
| 6,394,466 B1 * | 5/2002 | Matsumoto | B23B 31/008 | 279/103 |
| 6,444,941 B1 * | 9/2002 | Russo | B23H 7/26 | 219/69.15 |
| 6,725,750 B1 * | 4/2004 | Feltch | B23B 29/242 | 29/36 |
| 6,926,472 B2 * | 8/2005 | Arvidsson | B23B 27/12 | 407/110 |
| 7,112,020 B2 * | 9/2006 | Sheffler | B23B 31/005 | 279/83 |
| 7,240,593 B2 * | 7/2007 | Little | B23B 27/10 | 407/101 |
| 7,293,942 B2 * | 11/2007 | Travez | B23B 29/04 | 407/102 |
| 7,513,724 B2 * | 4/2009 | Kakai | B23B 31/11 | 279/8 |
| 7,713,004 B2 * | 5/2010 | Lehto | B23B 31/005 | 407/30 |
| 7,802,948 B1 * | 9/2010 | Bastiaans | B23B 31/1075 | 279/105.1 |
| 8,118,312 B2 * | 2/2012 | Walters | B23B 31/008 | 279/143 |
| 8,308,403 B2 * | 11/2012 | Hecht | B23B 29/04 | 279/77 |
| 8,312,615 B2 * | 11/2012 | Frota De Souza Filho | B23B 31/1076 | 29/525.01 |
| 8,534,963 B2 * | 9/2013 | Luik | B23C 3/28 | 279/83 |
| 8,668,411 B2 * | 3/2014 | Guy | B23B 27/007 | 279/71 |
| 8,668,413 B2 * | 3/2014 | Volokh | B23B 31/113 | 279/93 |
| 8,956,091 B2 * | 2/2015 | Nonaka | B23B 31/11 | 408/233 |
| 2002/0009342 A1 * | 1/2002 | Vasudeva | B23B 31/005 | 408/226 |
| 2002/0021945 A1 * | 2/2002 | Harpaz | B23B 31/11 | 407/53 |
| 2003/0210961 A1 * | 11/2003 | Arvidsson | B23C 5/06 | 407/48 |
| 2003/0210963 A1 * | 11/2003 | Kakai | B23B 31/008 | 408/231 |
| 2006/0048615 A1 * | 3/2006 | Treige | B23B 31/005 | 82/158 |
| 2006/0251483 A1 * | 11/2006 | Song | B23B 31/008 | 408/239 R |
| 2007/0298892 A1 * | 12/2007 | Leonard | B23B 31/1075 | 470/198 |
| 2008/0191429 A1 * | 8/2008 | Tugend | B23B 29/03414 | 279/30 |
| 2010/0143051 A1 * | 6/2010 | Lutfi | B23C 5/1018 | 407/11 |
| 2010/0322722 A1 * | 12/2010 | Lin | B23B 27/007 | 407/11 |
| 2011/0008114 A1 * | 1/2011 | Wang | B23B 29/24 | 407/44 |
| 2011/0318121 A1 * | 12/2011 | Eriksson | B23B 31/005 | 407/102 |
| 2012/0219375 A1 * | 8/2012 | Hobohm | B23B 31/11 | 409/234 |
| 2014/0202293 A1 * | 7/2014 | Van Handel | B23Q 11/0032 | 82/1.11 |
| 2014/0305268 A1 * | 10/2014 | Olsson | B23B 29/12 | 82/160 |
| 2015/0231708 A1 * | 8/2015 | McCormick | B23B 31/08 | 279/143 |

* cited by examiner

TOOLS HOLDER

BACKGROUND OF THE INVENTION

1. Field of the Invention

The invention relates to holders and more particularly to a tools holder capable of increasing length by assembling at least one additional component (e.g., interconnecting member) between base and blade by using a technique similar to mortise and tenon joint.

2. Description of Related Art

CNC (computer numerical control) lathes are widely employed as technologies advance. The CNC lathes can perform cutting, drilling, etc. on a workpiece. For example, a lathe may be required to cut a workpiece by using one of different blades.

However, the conventional lathe is only equipped with a cutter having a fastening member and a blade integrally formed with the fastening member which is secured to a mounting groove of the lathe. Length of the blade is fixed, i.e., not being adjustable. This means that it only can cut a workpiece of limited thickness. Thus, a cutter having a longer blade is required to mount on the lathe if a workpiece having a greater thickness. However, such cutters are expensive and inevitably increase the manufacturing cost.

Thus, the need for improvement still exists.

SUMMARY OF THE INVENTION

It is therefore one object of the invention to provide a tools holder comprising a base including a rear fastening member configured to secure to a mounting groove of a lathe, and a front groove member, and at least one hole extending from an outer surface to the groove member; a blade including a front cutting member and a rear tenon fitted into the groove member; and at least one fastener each driven through one of the at least one hole to urge against the tenon for fastening the base and the blade.

Preferably, further comprises at least one interconnecting member each including a rear tenon fitted into the groove member of the base, a front groove member for receiving the tenon of the blade, and at least one hole extending from an outer surface to the groove member thereof; at least one first fastener each driven through one of the at least one hole of the base to urge against the tenon of one of the at least one interconnecting member for fastening the base and one of the at least one interconnecting member together; and at least one second fastener each driven through one of the at least one hole of one of the at least one interconnecting member to urge against the tenon of the blade for fastening one of the at least one interconnecting member and the blade together.

Preferably, the groove member of the base is an annular groove.

Preferably, each of the at least one hole of the base is a threaded hole, and each of the at least one hole of each of the at least one interconnecting member is a threaded hole, each of the at least one first fastener is a threaded fastener, and each of the at least one second fastener is a threaded fastener.

Preferably, the tenon of the blade is shaped to fit into the groove member of the base.

Preferably, the tenon of each of the at least one interconnecting member is shaped to fit into the groove member of the base.

Preferably, the tenon of the blade is shaped to fit into the groove member of the base.

Preferably, the tenon of each of the at least one interconnecting member is shaped to fit into the groove member of the base.

It is envisaged by the invention that the tools holder is capable of increasing length by assembling at least one interconnecting member between the base and the blade by using a technique similar to mortise and tenon joint, thereby eliminating drawbacks (e.g., preparing blades of different length for cutting workpieces of different thickness, and increased manufacturing cost) of the cutter of the conventional lathe. Further, the assembly is secured due to complimentary engagement of any two adjacent components and the provision of threaded fasteners.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
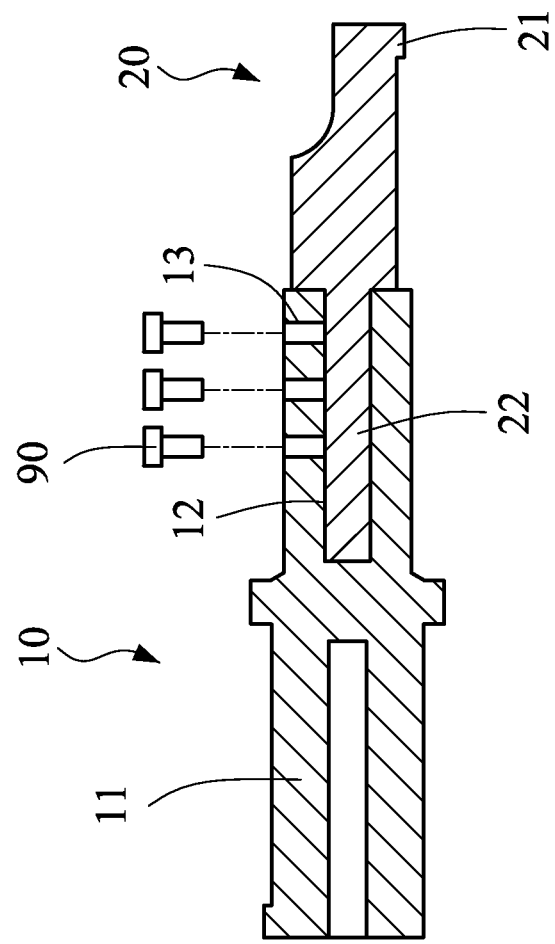
FIG. 1 is a longitudinal sectional view of a tools holder according to the invention.
Figure 2:
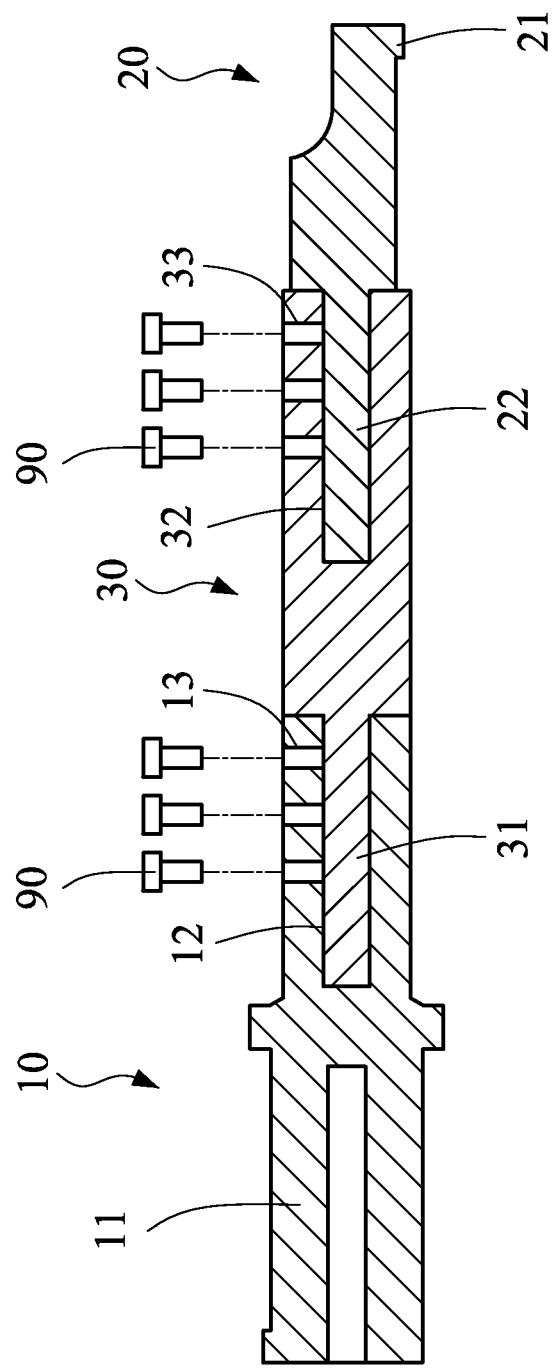
FIG. 2 is a longitudinal sectional view of a second configuration of the tools holder.
Figure 3:
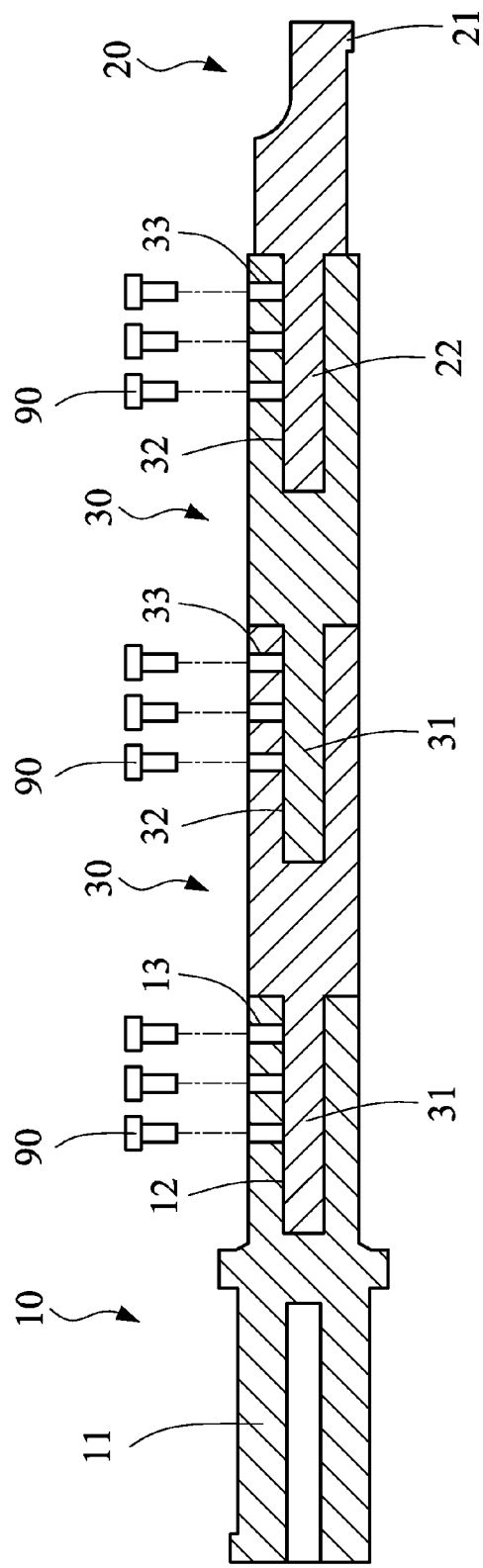
FIG. 3 is a longitudinal sectional view of a third configuration of the tools holder.

Referring to FIGS. 1 to 3, a tools holder in accordance with the invention comprises a base 10, a blade 20, and at least one interconnecting member 30 as discussed in detail below.

The base 10 includes a rear fastening member 11 adapted to secure to a mounting groove of a lathe, and a front groove member (or an annular groove) 12, and a plurality of holes (e.g., threaded holes) 13 extending from an outer surface to the groove member 12.

The blade 20 includes a front cutting member 21 and a rear tenon 22 shaped to fit into the groove member 12. A plurality of fasteners 90 are driven through the holes 13 to urge against the tenon 22 for fastening the base 10 and the blade 20 together. Preferably, the fasteners 90 are threaded fasteners.

In a second configuration (see FIG. 2), the interconnecting member 30 includes a rear tenon 31 shaped to fit into the groove member 12, a front groove member 32 shaped to complimentarily receive the tenon 22, and a plurality of holes (e.g., threaded holes) 33 extending from an outer surface to the groove member 32. A plurality of fasteners 90 are driven through the holes 13 to urge against the tenon 31 for fastening the base 10 and the interconnecting member 30 together. Further, a plurality of fasteners 90 are driven through the holes 33 to urge against the tenon 22 for fastening the interconnecting member 30 and the blade 20 together.

In a third configuration (see FIG. 3), two interconnecting members 30 are provided. F or the front interconnecting member 30, the tenon 31 is shaped to fit into the groove member 32 of the rear interconnecting member 30, and the groove member 32 is shaped to complimentarily receive the tenon 22. For the rear interconnecting member 30, the groove member 32 is shaped to complimentarily receive the tenon 31 of the front interconnecting member 30, and the tenon 31 is shaped to fit into the groove member 12 of the base 10. A plurality of fasteners 90 are driven through the holes 13 to urge against the tenon 31 for fastening the base 10 and the rear interconnecting member 30 together. Further, a plurality of fasteners 90 are driven through the holes 33 to urge against the tenon 22 for fastening the rear interconnecting member 30 and the front interconnecting member 30 together. Furthermore, a plurality of fasteners 90 are driven through the holes 33 to urge against the tenon 22 for fastening the front interconnecting member 30 and the blade 20 together.

It is envisaged by the invention that the tools holder is capable of increasing length by assembling at least one interconnecting member 30 between the base 10 and the blade 20 by using a technique similar to mortise and tenon joint, thereby eliminating drawbacks (e.g., preparing blades of different length for cutting workpieces of different thickness, and increased manufacturing cost) of the cutter of the conventional lathe. Further, the assembly is secured due to complimentary engagement of any two adjacent components and the provision of threaded fasteners 90.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A tools holder comprising:
   a base including a rear fastening member configured to secure to a mounting groove of a lathe, and a single first front groove member, and at least one first hole extending from an outer surface to the first front groove member;
   a blade including a front cutting member and a single first rear tenon;
   at least one interconnecting member including a single second rear tenon and a single second front groove member; and
   at least one first fastener driven through the at least one first hole to urge against on the first or second rear tenon for fastening the base and the blade,
   wherein the at least one interconnecting member is optionally connected between the base and the blade; when the base is directly connected to the blade, the first rear tenon is fitted into the first front groove member; when the at least one interconnecting member is applied, the second rear tenon is fitted into the first front groove, and the first rear tenon is fitted into the second front groove, wherein a dimension of the first front groove is identical to that of the second front groove, and a dimension of the first rear tenon is identical to that of the second rear tenon;
   wherein in a cross-sectional view along a longitudinal direction of the tools holder, the first front groove member has a first elongated slot formed between a first upper elongated portion and a first lower elongated portion, the second front groove member has a second elongated slot formed between a second upper elongated portion and a second lower elongated portion, and the rear fastening member has a third elongated slot formed between a third upper elongated portion and a third lower elongated portion;
   wherein the first elongated slot, the second elongated slot and the third elongated slot are arranged along a longitudinal axis of the tools holder.

2. The tools holder of claim 1, wherein the at least one interconnecting member further comprises at least one second hole extending from an outer surface to the second front groove member thereof; the at least one first fastener drives through the at least one first hole of the base to urge against the second rear tenon of the at least one interconnecting member for fastening the base and the at least one interconnecting member together; and at least one second fastener drives through the at least one second hole of the at least one interconnecting member to urge against the first rear tenon of the blade for fastening the at least one interconnecting member and the blade together.

3. The tools holder of claim 2, wherein the first front groove member of the base is an annular groove.

4. The tools holder of claim 2, wherein the at least one first hole of the base is a threaded hole, and the at least one second hole of the at least one interconnecting member is a threaded hole, the at least one first fastener is a threaded fastener, and the at least one second fastener is a threaded fastener.

5. The tools holder of claim 2, wherein the first rear tenon of the blade is shaped to fit into the first front groove member of the base.

6. The tools holder of claim 2, wherein the second rear tenon of the at least one interconnecting member is shaped to fit into the first front groove member of the base.

* * * * *